F. C. BRITT.
BEAN SEPARATOR.
APPLICATION FILED FEB. 13, 1909.
941,305.
Patented Nov. 23, 1909.
2 SHEETS—SHEET 2.
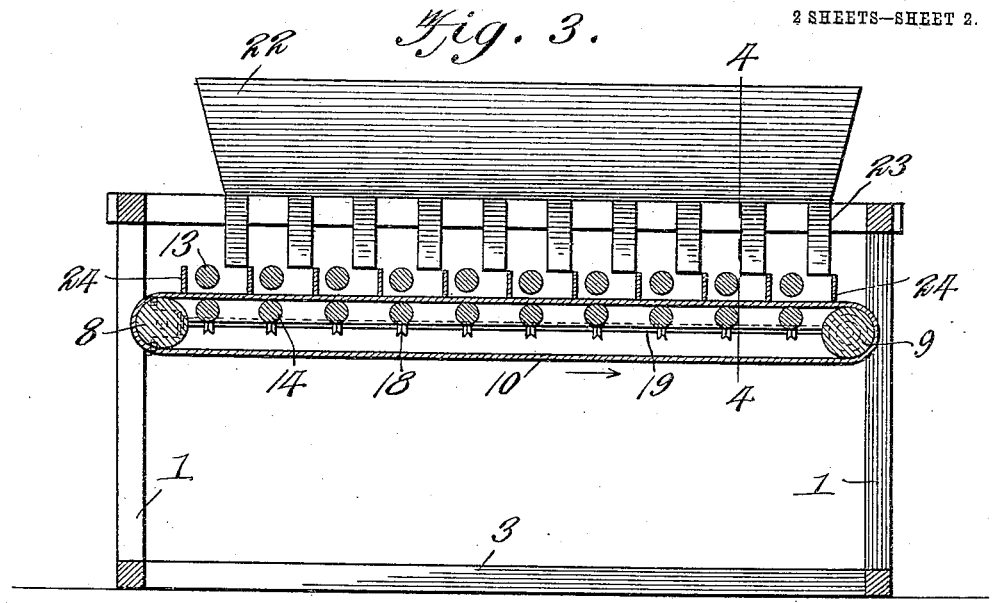
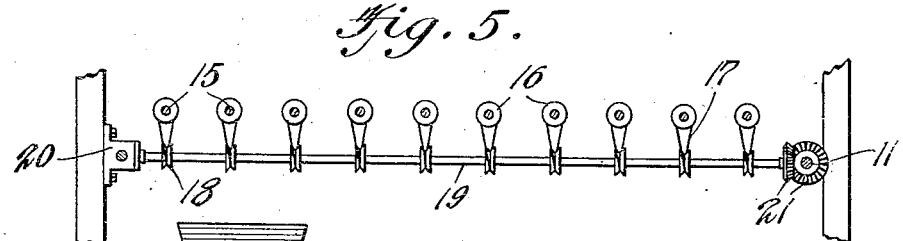
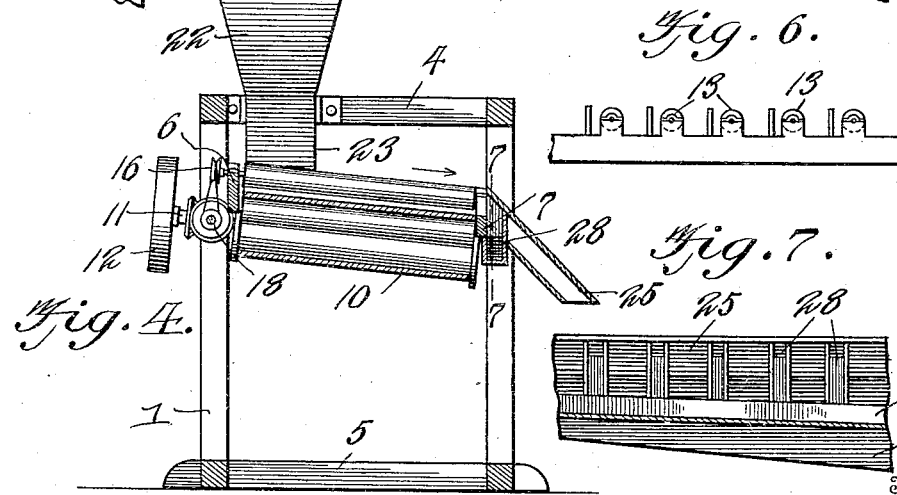
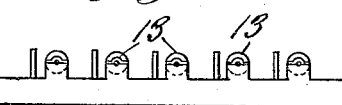
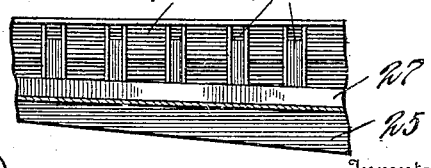
Witnesses
Frank B. Hoffman
P. M. Smith
Inventor
Frederick C. Britt
By Victor J. Evans
Attorney

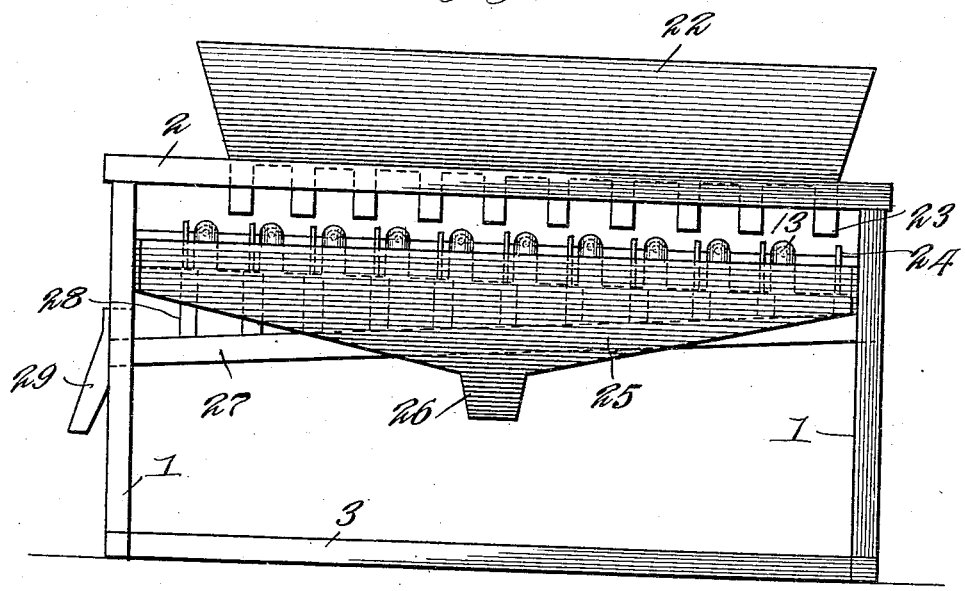
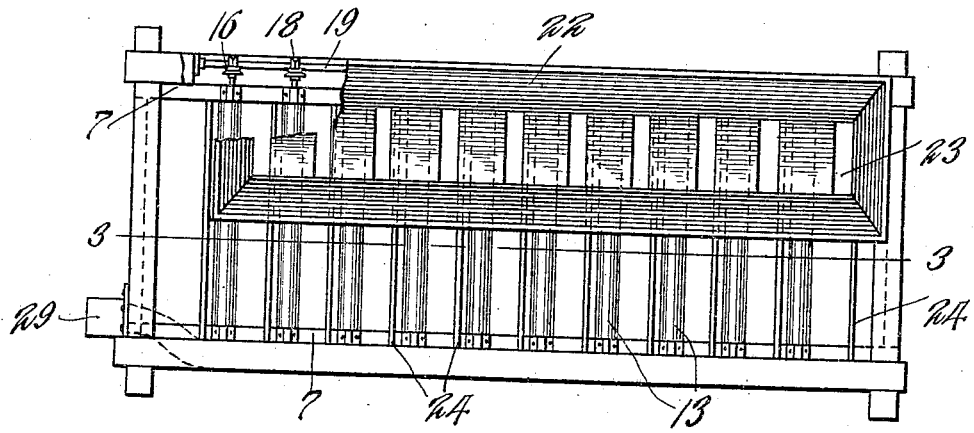

UNITED STATES PATENT OFFICE.

FREDERICK C. BRITT, OF MIDDLEPORT, NEW YORK.

BEAN-SEPARATOR.

941,305.

Specification of Letters Patent. Patented Nov. 23, 1909.

Application filed February 13, 1909. Serial No. 477,627.

*To all whom it may concern:*

Be it known that I, FREDERICK C. BRITT, a citizen of the United States, residing at Middleport, in the county of Niagara and State of New York, have invented new and useful Improvements in Bean-Separators, of which the following is a specification.

This invention relates to bean separators and pickers, the object of the invention being to provide a simple and reliable machine for effecting a separation between good and defective beans and the like and picking from the good beans any adhering material, thereby providing for the discharge of the good product from the machine in a clean and marketable condition.

While the invention will be described as adapted for the purpose of picking and separating beans, it will be obvious as the description proceeds that the machine is also adapted to operate with equally good effect on other products such as peas, wheat or grain of any kind.

With the above and other objects in view the nature of which will more fully appear as the description proceeds, the invention consists in the novel construction, combination and arrangement of parts as herein fully described, illustrated and claimed.

In the accompanying drawings: Figure 1 is an elevation of a separating and picking machine constructed in accordance with the present invention. Fig. 2 is a plan view thereof partly broken away to show the means for actuating the picking rolls. Fig. 3 is a vertical longitudinal section through the machine on the line 3—3 of Fig. 2. Fig. 4 is a vertical cross section through the same on the line 4—4 of Fig. 3. Fig. 5 is a detail vertical section showing the means for actuating the picking rolls. Fig. 6 is a detail elevation showing the arrangement of bearings for the picking rolls. Fig. 7 is a detail vertical longitudinal section on the line 7—7 of Fig. 4.

The frame of the machine contemplated in this invention is shown for convenience as comprising corner uprights or posts 1, top and bottom longitudinal beams 2 and 3 respectively and top and bottom cross beams 4 and 5 respectively.

In addition to the parts above referred to, the frame comprises the longitudinal bearing rails 6 and 7 located at different elevations and extending parallel to each other and having journaled therein the shafts of a pair of belt carrying rollers 8 and 9 located at opposite ends of the machine and inclined from end to end as indicated in Fig. 4. A carrier belt 10 travels around the rollers 8 and 9 and is laterally inclined as shown in Fig. 4. The shaft of one of the rollers is extended as shown at 11 and has mounted thereon a driving pulley 12 adapted to receive a driving belt from any suitable motive power whereby motion is imparted to the belt 10 and to the remainder of the machine as will hereinafter appear.

Arranged in a horizontal series above the top run of the belt 10 are picking rolls 13 mounted in bearings on the bearing rails 6 and 7 and inclined to correspond with the belt 10 and so as to operate in parallel relation thereto and close to the top run of the belt as shown in Fig. 3. Located between the two runs of the belt is a corresponding horizontal series of bearing rolls 14 which support the top run of the belt and sustain the pressure transmitted by the picking rolls 13. The shafts 15 of the picking rolls have mounted on the ends thereof grooved pulleys 16 around which pass belts 17 which extend downward around corresponding grooved pulleys 18 on a common transmission shaft 19 extending lengthwise of the machine frame and mounted in suitable bearings one of which is shown at 20. The shaft 19 is driven from the shaft 11 by means of bevel or miter gears 21, said gears being so proportioned that the picking rolls are driven at approximately the same surface speed as the carrier belt 10.

22 designates the main hopper for feeding the beans downward upon the carrier belt. This hopper is provided with a plurality of downwardly extending spouts 23 which discharge the beans just in advance of each of the picking rolls 13 as shown in Fig. 3 and just behind a series of check rails 24 in the form of slats disposed edgewise vertically and extending at an inclination corresponding with the lateral inclination of the carrier belt across the machine between the bearing rolls 7. The beans are thus discharged upon the belt 10 just in front of the picking rolls which act to pick and clean the good beans and direct the same off the lower edge of the belt while the bad beans are crushed and passed under the rolls until they are checked by the bars or rails 24 which serve to direct the bad beans off the lower edge of the belt.

25 designates the main receiving trough which extends practically the entire length of the frame and is inclined from its opposite ends downward toward its center where it terminates in a discharge nozzle 26. This trough 25 is arranged to receive the good beans. The defective or refuse beans are received in an inclined gutter 27 which extends lengthwise of the machine frame and is provided with a number of upstanding nozzles 28 which intersect the main receiving trough 25 as shown in Figs. 4 and 7 and are arranged directly in line with the check bars 24. The gutter 27 communicates at its lower end with a discharge spout 29. Any suitable receptacles may be placed beneath the discharge spouts 26 and 29.

It will be seen that the beans or the like, after being deposited on the endless carrier belt, are subjected to the picking action of the rolls 13 which revolve in the same direction and at the same surface speed as the endless carrier belt, the result being that the defective beans are carried under the picking rolls and between said rolls and the top run of the endless carrier belt, and against the check bars which direct the said defective beans into the nozzles 28. The good beans are held back by the picking rolls and subjected to the picking and cleaning action of said rolls which operate to free the beans from any adhering matter, the good beans gravitating or rolling down and off the lower edge of the carrier belt into the main receiving trough 25 and outward through the discharge spout 26 thereof.

I claim:—

1. A machine of the class described, comprising a laterally inclined endless carrier belt, picking rolls extending transversely across said belt and correspondingly inclined from end to end, check bars arranged at one side of the picking rolls and extending parallel thereto, a series of supporting rolls extending parallel to the picking rolls and arranged beneath the picking rolls and between the top and bottom runs of the belt, and means for simultaneously driving the belt and picking rolls at a substantially equal surface speed.

2. A machine of the class described, comprising a laterally inclined endless carrier belt, a series of inclined picking rolls extending transversely across the belt and in parallel relation thereto, check rails extending across the belt and arranged close to the belt and parallel to the picking rolls, a corresponding series of supporting rolls extending parallel to the picking rolls and arranged beneath the same and between the top and bottom runs of the belt, means for simultaneously driving the belt and picking rolls at a substantially equal surface speed, a receiving trough arranged to receive the good product from the lower edge of the belt, and a refuse gutter having upstanding nozzles intersecting the receiving trough and adapted to receive the defective beans and refuse directed thereto by the check bars.

In testimony whereof I affix my signature in presence of two witnesses.

FREDERICK C. BRITT.

Witnesses:
　Wm. D. Hoyt,
　Harry H. Freeman.